(No Model.)

F. BOSCH.
TEETHING RING.

No. 516,561. Patented Mar. 13, 1894.

Attest
G. M. Lamasure
J. H. Schott

Inventor
Franz Bosch
by Max Bergü
Atty

UNITED STATES PATENT OFFICE.

FRANZ BOSCH, OF MUNICH, GERMANY.

TEETHING-RING.

SPECIFICATION forming part of Letters Patent No. 516,561, dated March 13, 1894.

Application filed March 17, 1893. Serial No. 466,434. (No model.)

*To all whom it may concern:*

Be it known that I, FRANZ BOSCH, a subject of the King of Bavaria, residing at Munich, Bavaria, in the Empire of Germany, have invented certain new and useful Improvements in Devices for Facilitating Teething in Children, of which the following is a specification.

The development of the teeth, which, with children, is always attended with disorders and illness, demands an increased supply of salts of calcium to the gums. According to the manner and the quantities in which this supply of lime or calcium takes place these disorders and symptoms of disease are manifested to less or greater degree.

The object of the present invention is to supply, the gums with salts of calcium not only in the natural manner, but also by artificial means, and thereby to assist or facilitate dentition as much as possible. For this purpose a device embodying my invention consists in the means, features and combinations of parts hereinafter set forth and pointed out in the claims.

Figure 1:
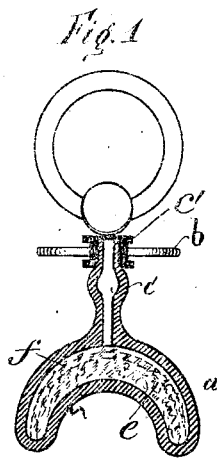
Figure 2:
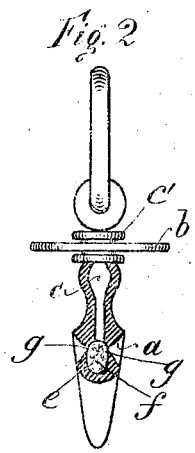
Figure 3:
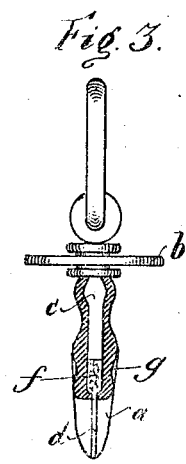

In the accompanying drawings—Figure 1 represents a longitudinal central section; and Fig. 2 a side elevation, partly in section, of a teething device under my invention; Fig. 3 a similar view of a modified form of teething device; and Fig. 4 a front elevation thereof.

In all the figures the same letters of reference designate the same parts.

Figure 4:
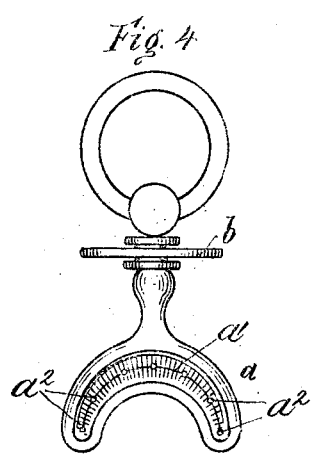

The device made under my invention is in the general form of the well-known rubber teething rings, consisting broadly of a stirrup or mouth-piece, $a$, of rubber or other suitable material. This stirrup, under my invention, is in the form of the gum and is provided on both sides with recesses or depressions of substantially semi-circular cross-section to embrace the gums. These recesses, as shown at $a'$ in Fig. 4, are roughened in order to excite the tooth-germs when the stirrup is grasped between the gums. The stirrup is provided with a handle and a safety-disk, $b$, in the manner of the well-known teething rings, the said safety-disk obviating the danger of swallowing the device.

The stirrup or mouth-piece when used has a calcium salt applied thereto and for this purpose may be coated or painted with a liquid containing lime or calcium-salts and then introduced between the gums of the infant. In order to enhance the supply of these salts the following additional means are resorted to.

As shown in Figs. 1 and 2, the mouth-piece, $a$, is hollow or provided with a cavity, $e$, containing a sponge, $f$, or other porous and absorptive body. A duct or tube, $c$, adapted to be closed at its outer end by a stopper, $c'$, communicates with the cavity, $e$, and serves to supply the latter with the solution of calcium salt. The mouth-piece is provided with lateral slits (indicated in dotted lines in Fig. 1) or perforations, $a^2$, through which the liquid can escape to the outside and into the recesses on either side of the mouth-piece, by virtue of the pressure of the gums or the suction which the infant or child exerts when the mouth-piece is introduced between the gums.

In Figs. 3 and 4 a modification is shown which in all respects is substantially similar to that in Figs. 1 and 2, with the exception that the mouth-piece is there provided with a longitudinal or meridianal slot, $d$, through which the calcium-salt solution is admitted to, the interior cavity, $e$, and the absorptive body, $f$. When the mouth-piece under this construction is grasped between the gums, the slot, $d$, is closed and the absorptive body, $f$, is compressed and the liquid it contains is caused to flow out of the same through the perforations, $a^2$, to the gums. In this modification the duct, $c$, is permanently closed at its outer end.

It is manifest that this device may be modified in many particulars without departing from the principle of my invention. Thus for example the material of which the mouth-piece, $a$, is composed may itself be treated or impregnated with an addition of a calcium compound.

What I claim, and desire to secure by Letters Patent, is—

1. In a teething ring a hollow mouth-piece having openings through its walls, and an absorptive body within the mouth-piece, substantially as set forth.

2. In a teething ring, a mouth-piece having recesses to embrace the gums on both sides, substantially as set forth.

3. In a teething ring, a hollow mouth-piece having a hollow integral tube connecting with the interior of the mouth-piece and a series of openings through its walls, in combination with an absorptive body located within the mouth-piece, substantially as set forth.

4. A teething ring having a mouth-piece in the shape of the gums and provided with recesses as g, on both sides, substantially as set forth.

5. A teething ring having a mouth-piece in the shape of the gums and provided on both sides with roughened recesses as g, substantially as set forth.

In testimony that I claim the foregoing as my invention I have signed my name in presence of two subscribing witnesses.

FRANZ BOSCH.

Witnesses:
  A. M. CUISUCHUNG,
  C. MAYER.